No. 677,990. Patented July 9, 1901.
G. ISRAEL.
PROTECTING PLATE FOR HORSES' HOOFS.
(Application filed Dec. 17, 1900.)
(No Model.)
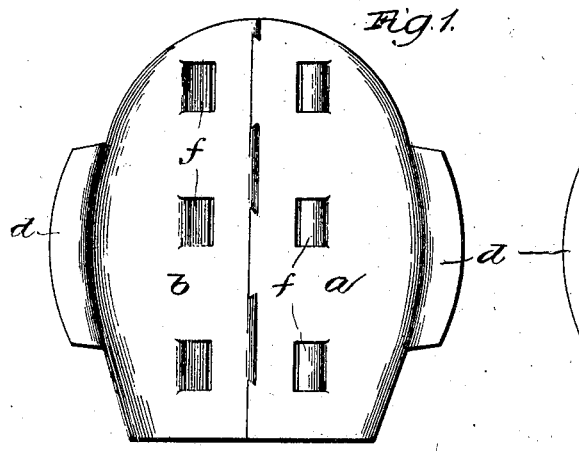
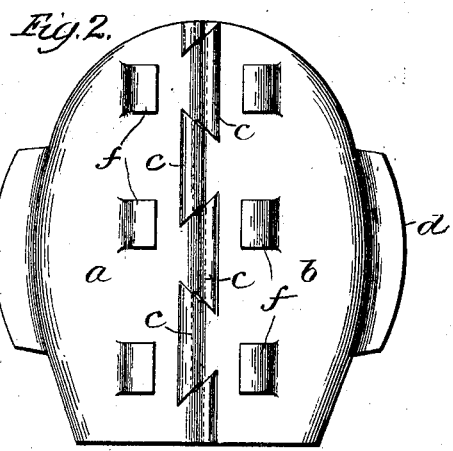
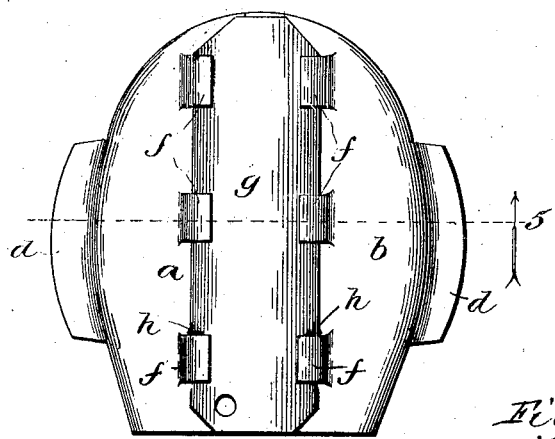
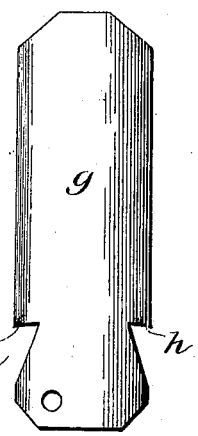
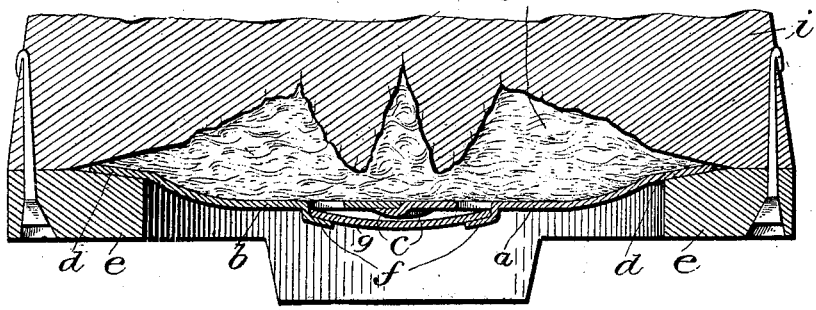
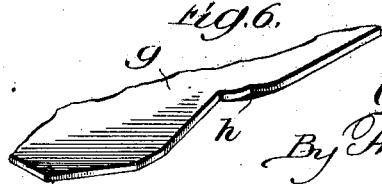
Witnesses:
Inventor:
Gustav Israel,
By Thomas F. Sheridan
Att'ys

UNITED STATES PATENT OFFICE.

GUSTAV ISRAEL, OF CHICAGO, ILLINOIS.

PROTECTING-PLATE FOR HORSES' HOOFS.

SPECIFICATION forming part of Letters Patent No. 677,990, dated July 9, 1901.

Application filed December 17, 1900. Serial No. 40,168. (No model.)

*To all whom it may concern:*

Be it known that I, GUSTAV ISRAEL, a citizen of the United States, residing at Chicago, in the county of Cook and State of Illinois, have invented certain new and useful Improvements in Protecting-Plates for Horses' Hoofs, of which the following is a specification.

My invention relates to a protecting-plate which is adapted to be used in combination with a horseshoe on the bottom of a horse's hoof, so as to protect the same, being the tenderest part thereof, from injury.

The principal object of the invention is to provide a simple, economical, and efficient protecting-plate adapted to be used in combination with a horseshoe for the protection of a horse's hoof; and the invention consists in the features, combinations, and details of construction hereinafter described and claimed.

In the accompanying drawings, Figure 1 is a plan view of a protecting-plate constructed in accordance with my improvements looking at it from above; Fig. 2, a similar view, looking at it from below, with the key-plate, hereinafter described, removed; Fig. 3, a plan view of the completed plate as it appears when ready for use looking at it from below; Fig. 4, a plan view of the key when removed from engagement with the plate; Fig. 5, a sectional elevation taken transversely through a horse's hoof, showing my plate in position; and Fig. 6, a perspective view of a part of the key.

In the art to which this invention relates it is well known that the lower part of the horse's hoof—that which is nearest the pavement—is exposed in such a manner as to be liable to injury either from bad pavements, broken glass, nails, or various other dangerous articles, and also that this portion of the horse's hoof is very sensitive to changes in temperature and the like. It is desirable, therefore, to protect it in as simple and efficient a manner as possible from injury and exposure.

The principal object of my invention, therefore, is to provide a protecting-plate which may be used in combination with a horse's shoe to protect the under side of a horse's hoof, all of which will be more fully hereinafter set forth.

In constructing a protecting-plate in accordance with these improvements I prefer to make it and divide it longitudinally into two parts $a$ and $b$, as shown particularly in Figs. 1 and 2, hinged together by interlocking projections $c$, substantially dovetailed in shape, and which act as hinges, as shown particularly in Fig. 5. This protecting-plate is made, as shown in the drawings, substantially in the shape of a horse's hoof and is provided with two outstanding winged portions $d$, one on each lateral edge, which are to be inserted between the horse's hoof and the shoe $e$, as shown in Fig. 5, and held in place thereby.

It will be seen from an inspection of the drawings and as above described that the plate is preferably made in two parts hinged together—that is, made so that each part can be folded partially or entirely on the other or buckled for the purpose of inserting it in position after the ordinary horseshoe is nailed or otherwise secured to the hoof. It is therefore desirable that some means be provided to lock this protecting-plate in position, and as the plate buckles outwardly along its longitudinal central line all that is necessary is to provide some means to prevent this folding or buckling movement. To accomplish this, each of the plates is provided with downwardly and inwardly projecting lugs $f$, which are preferably punched out of the plate, as shown particularly in Figs. 3 and 5, and which practically form, in connection with the plate proper, a saddle, into which a sliding key $g$ may be passed. This sliding key, as shown in Fig. 4, is notched at each lateral side, so as to provide two prongs $h$, which may be bent downwardly, as shown in Figs. 3 and 6, after the key has been inserted in position, so as to engage the lower lugs $f$ and prevent its ready withdrawal. Whenever it is necessary to remove the plate for any cause whatever, all that is required is to take a chisel or similar instrument and raise the lugs $f$, so as to permit the projecting prongs to pass thereunder, when such key can be readily withdrawn and the plate taken from its position on the horse's hoof. A perforation is made in the key $g$, adapted to admit a hook or similar instrument to withdraw the key.

To more securely protect the horse's hoof $i$ from exposure, a packing $j$ may be provided and inserted in the space between the bottom part of the hoof and the protecting-plate, which serves, when the hoof is diseased or injured, to assist in healing the same.

I claim—

1. A protecting-plate divided longitudinally and hinged together, provided with downwardly and inwardly turned lugs on each part to form a saddle, wings on each lateral edge for insertion between the horseshoe and hoof, and a key adapted to slide in the saddle or ways and lock the same in position, substantially as described.

2. A protecting-plate divided longitudinally, each part being provided with downturned lugs to form a saddle, and a key adapted to be passed between such lugs to prevent buckling of the plate and lock it in position, substantially as described.

3. A protecting-plate divided longitudinally and hinged together, each part provided with lugs parallel with the lugs on the other part to form a saddle or way and with wings on each lateral edge for insertion between the horseshoe and the hoof, and a key provided with downturned prongs adapted to be passed between the lugs to prevent the buckling or folding action of the plate and lock it in position, substantially as described.

GUSTAV ISRAEL.

Witnesses:
HARRY IRWIN CROMER,
ANNIE C. COURTENAY.